(12) United States Patent
Smith et al.

(10) Patent No.: US 8,731,753 B2
(45) Date of Patent: May 20, 2014

(54) CONTROL OF ENGINE START FOR A HYBRID SYSTEM

(75) Inventors: Anthony L. Smith, Troy, MI (US); Hong Yang, Rochester Hill, MI (US); Norman K. Bucknor, Troy, MI (US); Yongsheng He, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 268 days.

(21) Appl. No.: 13/216,311

(22) Filed: Aug. 24, 2011

(65) Prior Publication Data
US 2012/0083952 A1 Apr. 5, 2012

Related U.S. Application Data

(60) Provisional application No. 61/388,555, filed on Sep. 30, 2010.

(51) Int. Cl.
*B60W 20/00* (2006.01)

(52) U.S. Cl.
USPC .................. 701/22; 180/65.265; 903/930

(58) Field of Classification Search
None
See application file for complete search history.

(56) References Cited

U.S. PATENT DOCUMENTS

| | | | | |
|---|---|---|---|---|
| 5,751,070 | A | * | 5/1998 | Nagao et al. ................ 290/46 |
| 5,934,395 | A | * | 8/1999 | Koide et al. ............ 180/65.235 |
| 6,018,694 | A | * | 1/2000 | Egami et al. ................. 701/102 |
| 6,077,186 | A | * | 6/2000 | Kojima et al. ................. 477/3 |
| 2001/0028233 | A1 | * | 10/2001 | Omata et al. ................. 318/445 |
| 2002/0170758 | A1 | * | 11/2002 | Shimabukuro et al. ...... 180/65.2 |
| 2004/0030470 | A1 | * | 2/2004 | De La Salle et al. .......... 701/22 |
| 2007/0209618 | A1 | * | 9/2007 | Leone ......................... 123/90.12 |
| 2008/0234885 | A1 | * | 9/2008 | Suzuki .......................... 701/22 |
| 2012/0083385 | A1 | * | 4/2012 | Smith et al. ..................... 477/5 |
| 2012/0178585 | A1 | * | 7/2012 | Schoenek et al. ................ 477/5 |

OTHER PUBLICATIONS

Smith, A., Bucknor, N., Yang, H., and He, Y., Controls Development for Clutch-Assisted Engine Starts in a Parallel Hybrid Electric Vehicle, SAE 2011-01-0870, Apr. 12, 2011, SAE International, USA.

* cited by examiner

*Primary Examiner* — Fadey Jabr
*Assistant Examiner* — Krishnan Ramesh (57) ABSTRACT

A powertrain includes an electric motor providing propulsion torque to a transmission input shaft, an internal combustion engine, and an engine disconnect clutch selectively providing torque transfer between the engine and the motor. A method to control a flying engine start in the powertrain includes monitoring an output torque request, determining the propulsion torque to the transmission input shaft based upon the output torque request, determining a compensation torque to be provided to the engine disconnect clutch for the flying engine start, and controlling the motor to provide a motor torque based upon a sum of the propulsion torque and the compensation torque.

16 Claims, 7 Drawing Sheets

CONTROL OF ENGINE START FOR A HYBRID SYSTEM

CROSS REFERENCE TO RELATED APPLICATIONS

This application claims the benefit of U.S. Provisional Application No. 61/388,555, filed on Sep. 30, 2010, which is incorporated herein by reference.

TECHNICAL FIELD

This disclosure is related to control of a hybrid drive powertrain.

BACKGROUND

The statements in this section merely provide background information related to the present disclosure. Accordingly, such statements are not intended to constitute an admission of prior art.

Hybrid drive powertrains are known including a plurality of torque generative devices. For example, a powertrain can include an internal combustion engine and an electric motor, and the engine and the motor can be controlled to increase an overall efficiency of the vehicle, for example, by utilizing the motor in operation efficient for the motor, utilizing the engine in operation efficient for the engine, utilizing both devices to cooperatively provide torque when such operation is efficient, and utilizing the motor to regenerate energy to an energy storage device, for example, during braking of the vehicle or by drawing torque from the engine.

In an exemplary configuration, the engine and the motor each provide a torque to the powertrain. In another exemplary configuration, the engine supplies a torque to the motor, and the motor in turn supplies a torque to the rest of the powertrain.

Methods are known to shut down the engine when it is not being used to save the fuel that would be consumed by otherwise idling or running the engine at low speed. When the engine is shut down, a shaft leading from the engine to the powertrain will either cease turning, requiring the rest of the powertrain to adjust for the unmoving shaft, or the rest of the powertrain must supply a torque to turn the shut down engine, overcoming the torque (due to friction, cylinder pumping forces, etc.) required to turn the engine. A clutch device may be employed between the engine and the rest of the powertrain to permit the engine to remain shut down and remain stopped while the rest of the powertrain continues to function.

Clutch devices or clutches are used to selectively connect or disconnect shafts capable of transmitting torque. Clutches can be operated according to a number of ways known in the art. For example, hydraulic pressure can be utilized to actuate a clutch. An exemplary shift between states controlled by a pair of clutches requires that one clutch be unloaded, permitting two shafts that were previously coupled to spin freely of each other, and subsequently that another clutch be loaded, coupling two shafts that were formerly decoupled or free to spin relative to one another. Hydraulically actuated clutch devices frequently include clutch plates that are spring loaded to a default decoupled position, wherein hydraulic pressure applied to a piston applies pressure that overcomes the bias of the spring to bring the plates to a coupled position.

Engines can include a dedicated starter motor which supplies a torque to the engine in order to permit the normal combustion cycle of the engine to take over. Torque to start the engine can be drawn from the powertrain or the associated motor of the powertrain. A hybrid drive powertrain can include a plurality of motors wherein one motor can be used to provide a torque to the rest of the powertrain to propel a vehicle, while the other motor can be used to start the engine.

Hybrid drive powertrains can include a planetary gear set to manage transmission of torque through the powertrain. Planetary gear sets are mechanisms known in the art to include three gears or groups of gears. According to one exemplary configuration a sun gear is located at the center of the planetary gear set, a ring gear is located concentrically with the sun gear, and planet gears rotate between the sun gear and the ring gear, with teeth of each of the planet gears being in constant contact with teeth of the sun gear and the ring gear. Three planetary gears are an exemplary number of planet gears. The planet gears can be connected by a planet gear carrier which allows all of the planet gears to spin individually, but as the planet gears are driven around the axis of the planetary gear set, they drive the planet gear carrier, thereby supplying a torque to a shaft connected to the planet gear carrier. The same is true in reverse, that a torque can be applied to a planet gear carrier, thereby driving one or both of the other gears of the planetary gear set. Torque applied to one gear or set of gears is transferred to the remaining gears. Torque may be applied to two gears or set of gears to drive the third gear or set of gears.

SUMMARY

A powertrain includes an electric motor providing propulsion torque to a transmission input shaft, an internal combustion engine, and an engine disconnect clutch selectively providing torque transfer between the engine and the motor. A method to control a flying engine start in the powertrain includes monitoring an output torque request, determining the propulsion torque to the transmission input shaft based upon the output torque request, determining a compensation torque to be provided to the engine disconnect clutch for the flying engine start, and controlling the motor to provide a motor torque based upon a sum of the propulsion torque and the compensation torque.

BRIEF DESCRIPTION OF THE DRAWINGS

One or more embodiments will now be described, by way of example, with reference to the accompanying drawings, in which.

DETAILED DESCRIPTION

Figure 1:
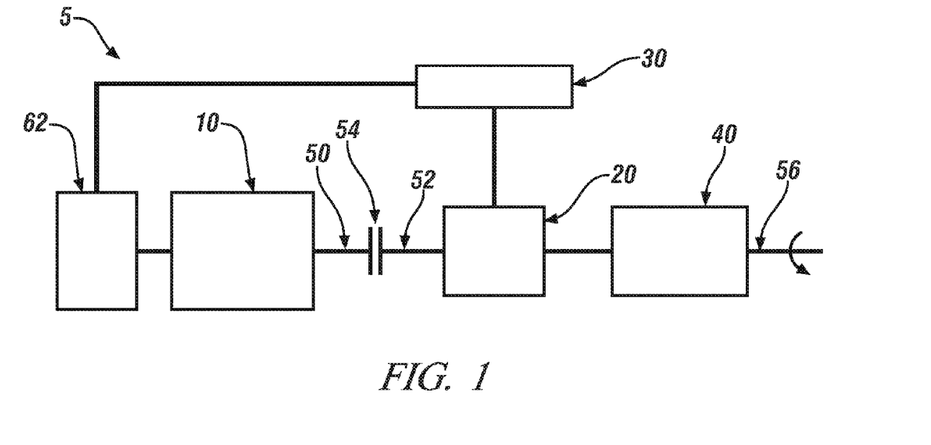
FIG. 1 illustrates an exemplary hybrid drive powertrain, in accordance with the present disclosure.

Referring now to the drawings, wherein the showings are for the purpose of illustrating certain exemplary embodiments only and not for the purpose of limiting the same, FIG. 1 illustrates an exemplary hybrid drive powertrain. Powertrain 5 includes engine 10, motor 20, energy storage device 30 and transmission device 40. Powertrain 5 can optionally include a second motor 62 transferring torque directly with the engine. Engine output shaft 50 connects to motor input shaft 52 through clutch device 54. When clutch device 54 is in an engaged state and there is no slip within the clutch device, engine output shaft 50 spins at the same rate as motor input shaft 52, and torque can be transmitted between the engine 10 and the motor 20. When clutch device 54 is disengaged or is in a disengaged state, engine 10 can turn at a different rate from motor 20 or is isolated from motor 20, or engine 10 can be shut down without affecting operation of motor 20. When clutch device 54 is disengaged, motor 20 can be utilized to provide torque to output shaft 56 through transmission 40 independently of whether engine 10 is in an operating state or a shut down state. Engine 10 is illustrated as being directly connected to motor 20 through shafts 50 and 52 and clutch device 54. Clutch device 54 may be referred to as an engine disconnect clutch (EDC). Clutch device 54 in one exemplary embodiment includes a hydraulically actuated clutch, to which hydraulic pressure can be controlled to vary torque capacity and varying levels of slip across the clutch device 54 can be enabled and controlled. It will be appreciated that a number of powertrain configurations are possible, for example, including use of planetary gear sets, to change the way in which engine 10 and motor 20 interact and provide torque to the powertrain 5. Clutch device 54 can exist between two shafts as illustrated in FIG. 1. Other embodiments are envisioned, for example, with transmission 40 including a braking clutch connected to a member of a planetary gear set and controlling how torque is transmitted through the planetary gear set to the output shaft 56. In another embodiment, a plurality of motors can provide torque to the output through the transmission while one or both are connected to the engine. A number of exemplary powertrain embodiments and configurations are envisioned to work with the methods disclosed herein, and the disclosure is not intended to be limited to the particular exemplary embodiments provided herein.

A flying engine start includes an engine initially at a stop and deactivated receiving torque from the rest of the powertrain to accelerate the engine, and the engine subsequently becoming operational. Through the course of a flying engine start, a previously disconnected engine is accelerated from an initial speed of zero to a speed that is synchronous with a speed of another shaft or a synchronous speed ($N_{e\_synch}$), such that a clutch connecting the engine to the other shaft can be locked and the engine can provide torque to the rest of the powertrain. In one embodiment, wherein the clutch is matching an engine speed to an input speed, the $N_{e\_synch}$ value that the engine must match is the input speed. If the speed to be matched is a dynamic profile, for example, an accelerating input speed, then $N_{e\_synch}$ must be determined based upon factors affecting operation of the powertrain. One exemplary factor is a capability of the engine to accelerate from a stop to a given speed with acceptable parameters. For a given input speed profile and an engine with known properties, $N_{e\_synch}$ can be determined through calibration, calculation, modeling or any method sufficient to accurately predict operation of the engine, clutch, and remainder of the powertrain, and a number of calibration curves or prediction modifiers can be utilized for different conditions and operating ranges. $N_{e\_synch}$ provides a speed that the engine must achieve to complete the flying engine start. If the shaft speed being matched is steady, then the engine can have flexibility in achieving $N_{e\_synch}$. If the shaft speed being matched is dynamic, then the engine will be required to reach $N_{e\_synch}$ at a particular time to avoid drivability issues in completing the flying engine start. $N_{e\_synch}$ can be used to determine a time at which the engine must be started and an acceleration that the engine must achieve for the engine to achieve $N_{e\_synch}$ at a proper time. Such a starting time for the engine and required acceleration of the engine can be embodied as a desired engine activation speed profile.

A number of methods can be utilized to start engine 10 from a shut down state to an operating state. A flying engine start can include starting the engine 10 and transitioning from the shut down state to an operating state while the motor 20 is providing torque to the transmission 40. According to one exemplary embodiment, a flying engine start can be accomplished by engaging clutch device 54, thereby supplying torque from motor device 20 to engine 10 and rotating engine 10 such that the combustion cycle can begin. However, one will appreciate that such an engagement of clutch device 54 while motor 20 is providing torque to transmission 40 can create a perceptible change to the torque provided to the output shaft 56 and associated driveline or adversely affect drivability.

Control modules can control operation of engine 10, motor 20, motor 62, transmission 40, and clutch device 54. Control methods can be employed by the control modules synchronizing operation of the different devices in order to maintain drivability of the overall powertrain. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed based on events or at regular intervals, for example each 3.125, 6.25, 12.5, 25 and 100 milliseconds during ongoing engine and vehicle operation.

Drivability can be adversely affected by abruptly engaging an EDC to a motor already providing torque to a transmission. The motor, based upon a motor torque command, draws an amount of power from an associated energy storage device based upon the torque that the motor is expected to provide to the transmission. Engaging the EDC while the motor continues to draw the same amount of power results in the same torque output by the motor being divided between the transmission and the engine. A desired engine activation speed profile can be determined for a particular flying engine start, such that expected operation of the engine through the engine start can be determined. Controlling a powertrain through a flying engine start includes determining a motor torque required to provide desired torque to the transmission, determining a motor torque that will be required by the EDC providing the necessary torque to the engine to execute the flying engine start, and controlling the motor by summing the motor torque that will be required by the EDC providing the necessary torque to the engine and the motor torque required to provide desired torque to the transmission.

According to one embodiment, a flying engine start can include applying torque to an engine through an EDC including closed-loop control of the EDC, for example, based upon comparing an actual engine speed to an engine speed profile for the flying engine start, to ensure controllability of the clutch and open-loop control of the EDC with P-I curve adaptation based upon a solenoid current and clutch pressure feedback at steady state. Testing, estimating, or modeling EDC clutch pressure through a flying engine start can be used to determine a required motor torque necessary to compensate for engine load upon the EDC or a motor compensation torque while spinning the engine. In one embodiment, torque required to spin the engine through the flying engine start, for example, as can be determined through testing, estimation or modeling, can be used to determine or estimate a compensation torque required to supply the torque required to spin the engine. Determining the compensation torque can include using a clutch pressure-torque model to estimate a reaction torque in the EDC. Further, a pressure-torque compensation model can be used to compensate for nonlinearity, time lag and temperature effects present in hydraulic pressure measurement. In one embodiment, open-loop EDC torque can be controlled based upon a feed-forward calculation of engine inertia torque, friction, and compression torque. Engine inertia torque can be calculated based upon a calibrated engine acceleration profile. In one embodiment, propulsion torque can be further controlled or smoothed using modulated pressure to a transmission output clutch. Slipping the transmission output clutch isolates the downstream driveline from oscillations which occurs due to imperfectly compensated disturbance during flying engine start event, permitting slip when torque applied to the transmission output clutch goes above a selected value.

Figure 2:
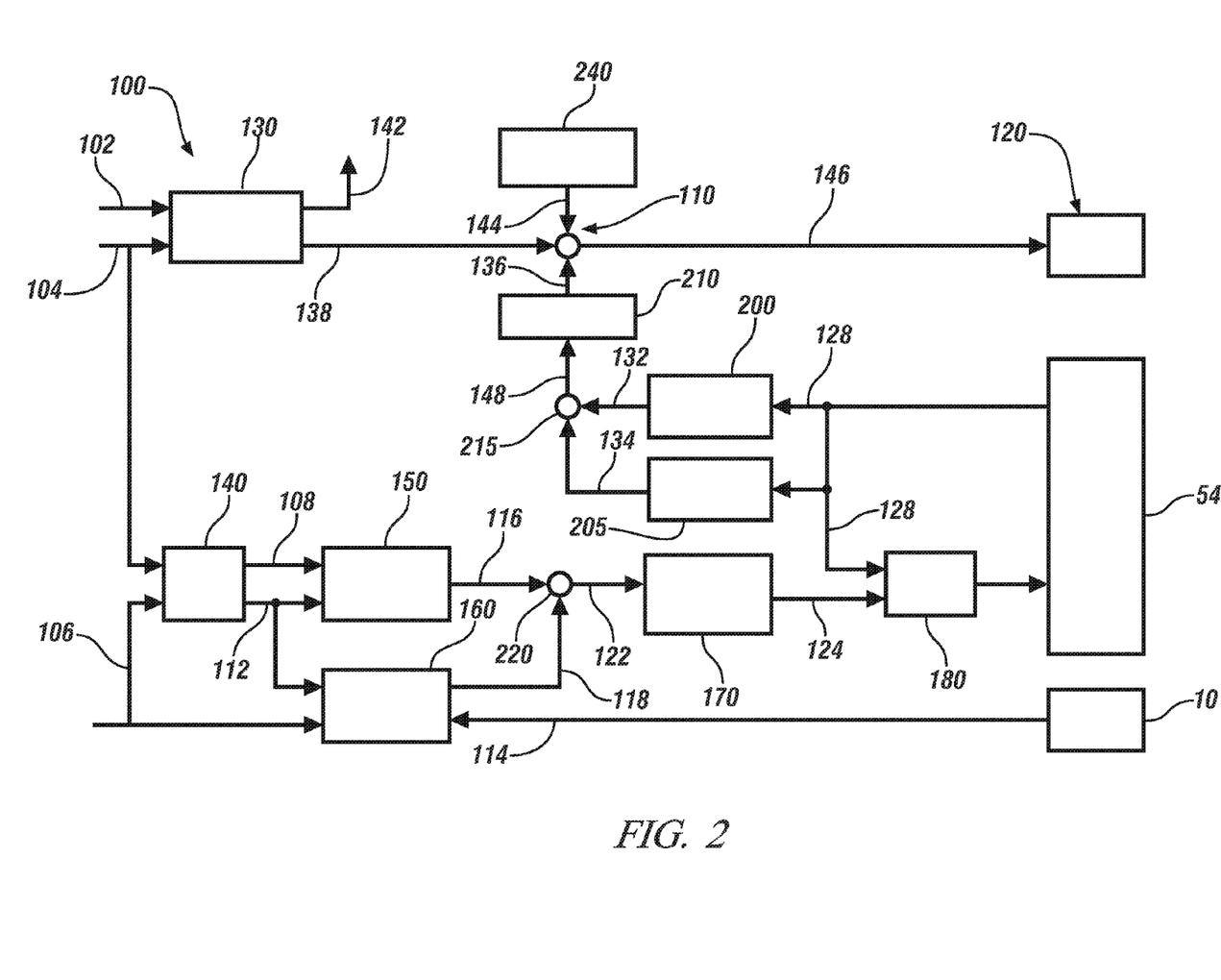
FIG. 2 illustrates an exemplary control module for executing a flying engine start, in accordance with the present disclosure.

FIG. 2 schematically illustrates an exemplary control module for executing a flying engine start. Flying engine start control module 100 includes summation block 110, which sums a motor torque required to propel the driveline or propulsion torque ($T_{m\_propel}$) 138 and required motor torque necessary to compensate for engine load upon the EDC through a flying engine start or motor compensation torque ($T_{m\_comp}$) 136 and outputs a motor torque command ($T_{m\_cmd}$) 146 to motor inverter 120 controlling an associated motor. Flying engine start control module 100 can additionally include driveline active damping control module 240 providing signal 144 based upon reducing torque variation in the output torque to summation module 110. Control module 100 can receive an input from the engine control module regarding required engine torque generation, or control module 100 can directly compute the required engine torque generation.

The illustrated flying engine start control module 100 determines a number of terms in support of $T_{m\_comp}$ 136. Engine speed profiling module 140 determines an engine speed profile for the flying engine start including a desired engine acceleration 108 ($N_{edot\_ref}$) and a desired engine speed 112 ($N_{e\_ref}$) based upon an actual engine speed 106 and a current output speed of the transmission output or current output speed 104. $N_{edot\_ref}$ 108 and $N_{e\_ref}$ 112 are used in open-loop EDC torque control module 150 to determine an open-loop EDC torque control term 116 or open-loop clutch control term. $N_{e\_ref}$ 112, actual engine speed 106, and actual engine torque 114 are used in closed-loop EDC slip control module 160 to determine a closed-loop EDC torque control term 118 or closed-loop clutch control term. Open-loop EDC torque control term 116 and closed-loop EDC torque control term 118 are summed in summation module 220, forming an EDC torque command 122. EDC torque command 122 is converted based upon torque and pressure properties of the EDC in module 170 to determine EDC pressure command 124. EDC pressure command 124 is compared to an actual EDC pressure 128 within closed-loop pressure regulation module 180. Actual EDC pressure 128 can be a measured value such as can be measured by a pressure transducer or actual EDC pressure 128 can be an estimated value. Closed-loop pressure regulation module 180 uses the difference to control EDC 54. EDC 54 can exist as a separate device in the powertrain. In one embodiment, EDC 54 can be a part of and/or be controlled with the transmission. Actual EDC pressure 128 is used by clutch pressure-torque model 200 to estimate a reaction torque 132 in the EDC 54. Further, pressure-torque compensation model 205 uses actual EDC pressure 128 to determine torque compensation value 134 for nonlinearity, time lag and temperature effects. Reaction torque 132 and torque compensation value 134 are summed in summation module 215 to form EDC torque estimate 148. Clutch torque compensation module 210 uses EDC torque estimate 148 to determine $T_{m\_comp}$ 136. Propulsion torque control module 130 monitors current output speed 104 and output torque request 102 to determine engine torque command 142 and $T_{m\_propel}$ 138. Summation module 110 sums $T_{m\_comp}$ 136, $T_{m\_propel}$ 138, and signal 144 to determine $T_{m\_cmd}$ 146 for controlling the motor or motors of the vehicle. Flying engine start control module 100 provides an exemplary embodiment of a control module to execute the methods disclosed, however, it will be appreciated that a number of different embodiments of control modules can be utilized, and the disclosure is not intended to be limited to the exemplary embodiment disclosed herein.

Hydraulic pressure to the EDC or other clutches can be a function of controlling a main hydraulic pump, frequently associated with the input speed of the transmission, and an auxiliary pump. Control of the main and auxiliary pumps and the hydraulic pressure delivered to the system controlling clutches can including monitoring discharge pressures of one or the other pump and regulating pressure to the system accordingly. Clutches include clutch fill events, wherein control methods known in the art are utilized to rapidly bring an unfilled clutch to a point where it is ready to begin applying pressure to the associated clutch pads or the touchpoint of the clutch. Such a point can be referred to the point of incipient torque in the clutch.

Figure 3:
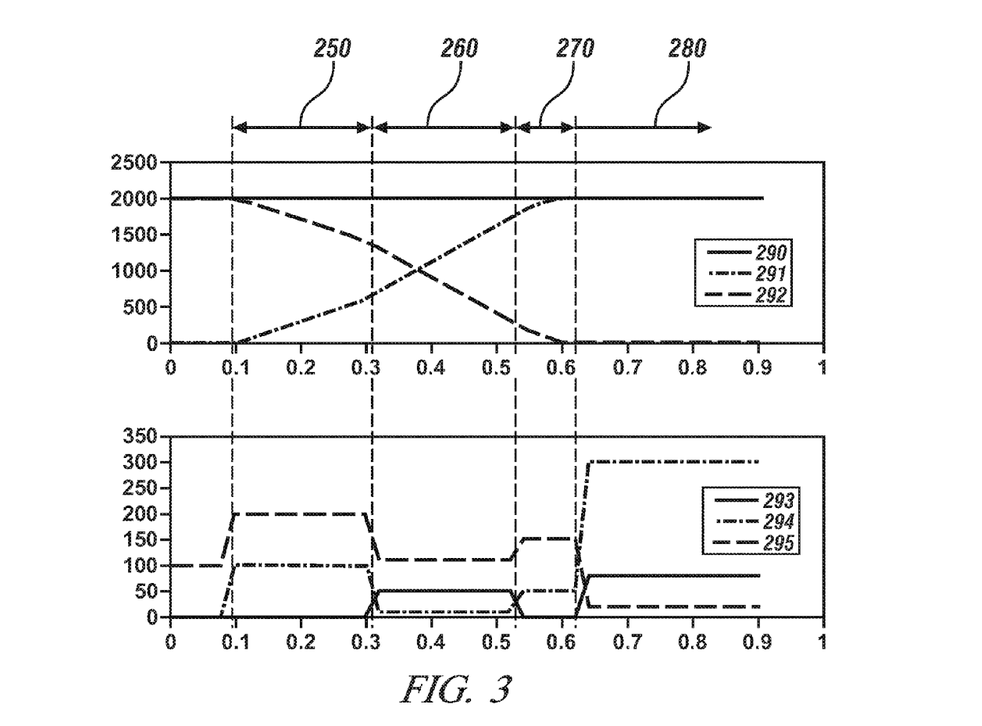
FIG. 3 illustrates four stages of an exemplary EDC control method, in accordance with the present disclosure.

FIG. 3 illustrates four stages that an exemplary method to control an EDC can be broken down into. In a top portion of the figure, a horizontal axis illustrates a time period in seconds and a vertical axis illustrates speed in revolutions per minute. A motor speed 290, an engine speed 291, and an EDC speed differential 292, illustrating a speed difference or slip between the plates of the clutch or the difference between engine speed 291 and a transmission input speed, are illustrated. In a bottom portion of the figure, a horizontal axis corresponds to the same time period as illustrated in the top portion, and a vertical axis illustrates torque in Newton meters. An engine torque command 293, a torque transmitted through the EDC or clutch torque 294, and a motor torque command 295 are illustrated. Stage A 250 is the engine cranking stage, where the engine torque command 293 is zero and the EDC is applied to spin up the engine. The motor torque command 295 is augmented to compensate for the clutch torque 294 based on an EDC clutch torque estimate. In Stage B 260, the engine has fired and engine torque commands 293 are used to bring the engine speed 291 close-to synchronization in open-loop control mode. Along with the open-loop control of the engine torque, the EDC is under closed-loop slip control to reach a desired EDC speed differential 292 between the engine speed 291 and the motor speed 290 and the associated transmission input speed. In Stage C 270, the engine speed 291 is close to the transmission input speed and EDC speed differential 292 illustrating EDC slip is reduced to the minimum desired level through clutch slip control with minimal engine torque commanded. This is intended to minimize engine torque torsional disturbances on the driveline as the EDC locks up. In Stage D 280, the EDC is locked and the engine torque 293 is ramped up as motor torque 295 is ramped down, thus completing the engine start sequence.

FIG. 3 graphically illustrates one embodiment of a flying engine start, including associated speeds and torques. As illustrated in the top portion of FIG. 3, the motor speed 290 can remain unaffected by the flying engine start. An engine speed 291 starts initially at zero and transitions through stages A 250 (starting engine), B 260 (ramping up engine speed), and C 270 (synchronization) to achieve same speed operation in stage D 280. A motor torque is initially 100 Nm, a value in this example required to be provided to the transmission to propel the driveline (for example, based upon an output torque request.) In stage A 250, clutch torque 294 is increased to provide a torque required to start turning the engine. The motor torque 295 is increased during the increase in clutch torque 294, such that torque can be supplied to the EDC without interrupting the 100 Nm required to be provided to the transmission to propel the driveline. Through stage B 260, the engine is in an operating mode. The EDC can be disengaged partially or fully, reducing or eliminating the motor torque provided to the engine. Through stage B 260, the engine increases speed based upon torque supplied by the engine. In stage C 270, the EDC is again engaged, engine torque 293 is dropped to or near zero, and motor torque 295 is again increased, such that the motor can control the remaining increase in engine speed 291 required to synchronize the engine speed 291 to the motor speed 290. One having skill in the art will appreciate that the motor is capable of finer control with a smaller time delay than the engine, and motor control through stage C 270 provides a smoother transition. Finally, in stage D 280, engine torque and motor torque can be determined according to desired steady state operation of both devices based upon overall desired operation of the powertrain.

Throughout the process of the flying engine start utilizing a slipping clutch, the EDC torque capacity is commanded to overcome the inertia torque associated with the desired engine acceleration profile as well as the gas compression torque during the engine cranking stage, and the motor torque needs to compensate for the EDC load while providing the commanded propulsion torque for the vehicle. In stage A, before EDC lockup, the clutch torque, $T_{edc}$, motor torque, $T_{m\_cmd}$, and the engine torque, $T_{e\_cmd}$, can be determined as follows:

$$T_{edc\_ol} = T_{gas} + I_{inertia} * \alpha_{eng.profile} \quad [1]$$

wherein $T_{edc\_ol}$ is the open-loop portion of the clutch torque,
$T_{gas}$ is the gas compression torque,
$I_{inertia}$ is a moment of inertia for the engine,
$\alpha_{eng.profile}$ is an angular acceleration required of the engine.
Eq. 1 can additionally include a friction torque term. A closed-loop portion of the clutch torque, $T_{edc\_cl}$, can be expressed as follows:

$$T_{edc\_cl} = T_{PID} \quad [2]$$

wherein $T_{PID}$ is a proportional-integral-derivative controller output based on $N_{edot\_ref}$ 108, $N_{e\_ref}$ 112, and actual engine speed 106.
Once $T_{edc\_ol}$ and $T_{edc\_cl}$ are determined, $T_{edc}$ can be determined as follows.

$$T_{edc} = T_{edc\_ol} + T_{edc\_cl} \quad [3]$$

As disclosed in relation to FIG. 2, $T_{m\_cmd}$ can be determined as follows.

$$T_{m\_cmd} = T_{m\_propel} + T_{m\_comp} \quad [4]$$

In one embodiment, $T_{m\_comp}$ can be expressed as a monitored torque transmitted through the EDC, $T_{edc\_actual}$. During stage A, the engine begins at zero engine speed and is nonoperational. At a point at or near the transition from stage A to stage B, the engine reaches a speed whereat the engine can become operational, combusting a charge and providing an engine torque. During stage B, the EDC can be disengaged partially or fully in order to avoid engine torque impacting the total torque transmitted to the driveline if the EDC locks up. The engine torque is commanded as shown in Eq. 5 such that the engine torque is less than or equal to the torque necessary for the engine speed to follow the commanded engine profile. This is performed in order to prevent the engine speed from overshooting the desired engine speed profile. Similar to Eq. 1, Eq. 5 can additionally include a friction torque term.

$$T_{e\_cmd} \leq T_{gas} + I_{inertia} * \alpha_{eng.profile} \quad [5]$$

The effect of different engine starting positions can be utilized to control $T_{edc}$ and $T_{m\_cmd}$ at the initiation of stage A. The clutch torque controller must raise clutch torque capacity to a level sufficient to overcome the resisting torque due to air trapped in the cylinder undergoing the first compression stroke. The magnitude of this torque is dependent on the initial engine start position since the amount of air being compressed will depend on how close that cylinder is to TDC when the engine crank event is started. This therefore complicates the determination of the minimum clutch capacity. An exemplary calibration can examine an engine for a plurality of crankshaft initial positions. According to one exemplary embodiment, calibrated data from two engine revolutions at 45 crank angle degree intervals can be utilized to estimate effects of engine starting position. Other intervals or other methods of determining the effects of engine starting position can be utilized. Differences in the clutch torque capacity and engine speed can be used to predict engine operation due to a variable engine starting position. The driveline disturbance can be about the same if sufficient motor torque reserve exists to compensate for the clutch load while propelling the vehicle and can be gauged by the change in motor speed in the upper plot. Additionally or in the alternative, a method is disclosed to adjust some or all valves on the engine to an open position during a cranking stage or during stage A or some part of stage A in order to reduce the torque required to turn the engine.

During stage B, engine speed can be controlled in an open-loop control through $T_{e\_cmd}$. Slip control, controlling the EDC speed differential, can be accomplished through closed-loop slip control (PI) of the clutch. $T_{edc}$ can still be determined as a sum of $T_{edc\_ol}$ and $T_{edc\_cl}$. In one embodiment, $T_{edc\_ol}$ can be limited to a low limit value, $T_{edc\_low}$, in an exemplary range of 20 to 50 Nm. $T_{e\_cmd}$ can then be set to equal the following.

$$T_{e\_cmd} = I_{inertia} * \alpha_{eng.profile} - T_{edc\_low} \quad [6]$$

The speed profile for the engine can include a target speed close to $N_{e\_synch}$. $T_{m\_cmd}$ can be expressed as $$T_{m\_cmd} = T_{m\_propel} + T_{m\_comp} \quad [7]$$

During stage B, the engine can be made operational or can be maintained in a nonoperational state based upon whether $N_{e\_synch}$ is a high value, requiring rapid acceleration of the engine that can be assisted by operation of the engine, and a desire to prevent engine speed overshoot that can result from operation of the engine.

During stage C, $T_{e\_cmd}$ can be reduced to some low level or zero, as the torque from the motor is used to bring the engine into synchronous operation with the motor. The EDC speed differential can be controlled in a closed-loop (e.g. PID control) through $T_{edc}$.

$$T_{edc} = T_{edc\_ol} + T_{edc\_cl} \quad [8]$$

$$T_{edc\_ol} = I_{inertia} * \alpha_{eng.profile} - T_{e\_cmd} \quad [9]$$

$$T_{edc\_cl} = T_{PID} \quad [10]$$

$$T_{m\_cmd} = T_{m\_propel} + T_{m\_comp} \quad [11]$$

Similar to Eq. 1, Eq. 9 can additionally include a friction torque term. Operation as disclosed in stage C can prevent engine speed overshoot that can result from transitory operation of the engine.

During stage D, engine speed has been synchronized with the motor speed and input speed, and the EDC speed differential is substantially zero. The EDC can be fully engaged. $T_{e\_cmd}$ can be increased to a desired level based upon a desired operation of the powertrain, for example, based upon an output torque request, $T_{O\_REQ}$. $T_{m\_cmd}$ can be modulated to a desired level based upon desired operation of the powertrain and available torque from the engine.

Figure 4:
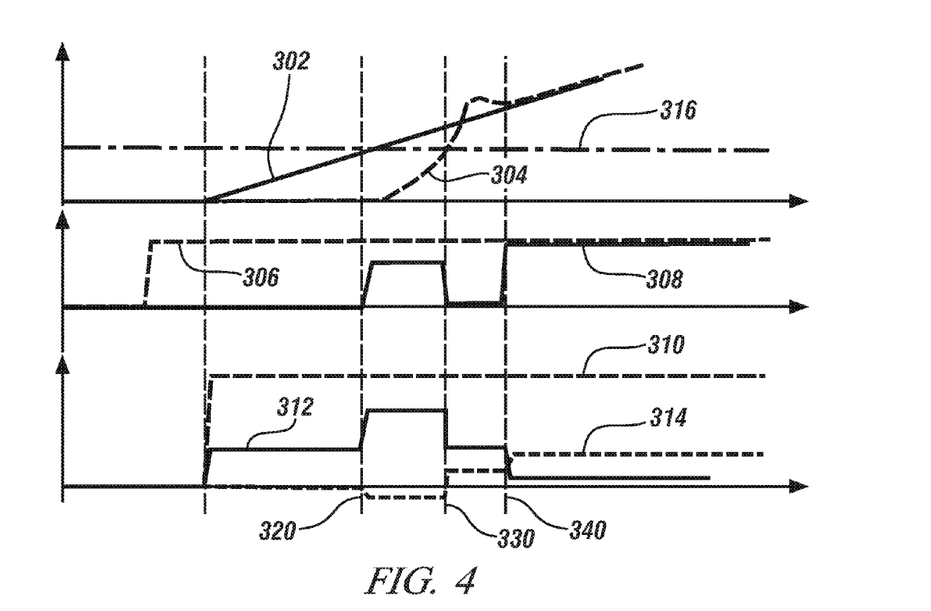
FIG. 4 illustrates an exemplary flying engine start, including associated speeds and torques, including, in accordance with the present disclosure.

FIG. 4 graphically illustrates an exemplary flying engine start, including associated speeds and torques, including the engine speed overshooting the desired engine activation speed profile. In a top portion of the figure, a horizontal axis illustrates a time period in seconds and a vertical axis illustrates speed in revolutions per minute. An input speed 302 and an engine speed 304 are illustrated. In a central portion of the figure, a horizontal axis corresponds to the same time period as illustrated in the top portion and a vertical axis illustrates clutch engagement. A transmission clutch can be utilized between the motor and a transmission input shaft or within the transmission to dampen or limit torque pulses transmitted through the transmission to the transmission output shaft. According to one exemplary method, a torque capacity of the transmission clutch can be reduced such that torque pulse in excess of the torque capacity cause the transmission clutch to slip, thereby dampening the pulse from the torque transmitted through the transmission or dampening an effect of the flying engine start on the output torque. Transmission clutch 306 and EDC 308 are illustrated, representing a torque capacity created in each of the clutches. In a bottom portion of the figure, a horizontal axis corresponds to the same time period as illustrated in the top portion, and a vertical axis illustrates torque. Output torque 310, motor torque 312, and engine torque 314 are illustrated. Input speed 302 accelerates from zero at a constant rate. Transmission clutch 306 is initially set to an engaged state and maintained at that state. For this example, output torque 310 is set to a value and maintained. In the period starting when the input speed 302 begins to accelerate, motor torque 312 is set to a value to generate output torque 310. For a period after input 302 begins to accelerate, the engine speed 304 remains at zero and the EDC 308 remains in a disengaged state. At time 320, stage A of a flying engine start is initiated. EDC 308 changes to a slip state, wherein motor torque 312 can be utilized to provide torque to the engine while the engine speed 304 and the input speed 302 remain different values. At time 320, engine speed 304 begins to accelerate, and motor torque 312 increases in order to provide torque to the engine while maintaining output torque 310. At time 330, engine speed 304 achieves an engine firing speed 316, and stage B of the flying engine start can be initiated. At time 330, the engine can be fired and made operational, providing an engine torque and accelerating the engine speed 304 based upon an engine speed profile selected to achieve $N_{e\_synch}$. EDC 308 can be reduced to a minimum level and motor torque 312 returns to a level maintaining the output torque 310 without providing any torque to the engine. EDC 308 or the clamping pressure can be reduced during stage B to a nonzero minimum value to reduce or eliminate torque transmission between the engine and the motor while the engine accelerates under its own power while the clutch remains in a non-purged state, such that control of the hydraulic pressure to the clutch can quickly return the clutch to a partially or fully engaged state subsequent to stage B. FIG. 4 illustrates the engine speed 304 overshooting the profile of input speed 302. Further, stage C in this embodiment of the flying engine start is omitted, and the engine is utilized to adjust the engine speed 304 according to $N_{e\_synch}$. At time 340, stage D of the flying engine start is initiated, $N_{e\_synch}$ is achieved, and the EDC 308 can be fully engaged.

Figure 5:
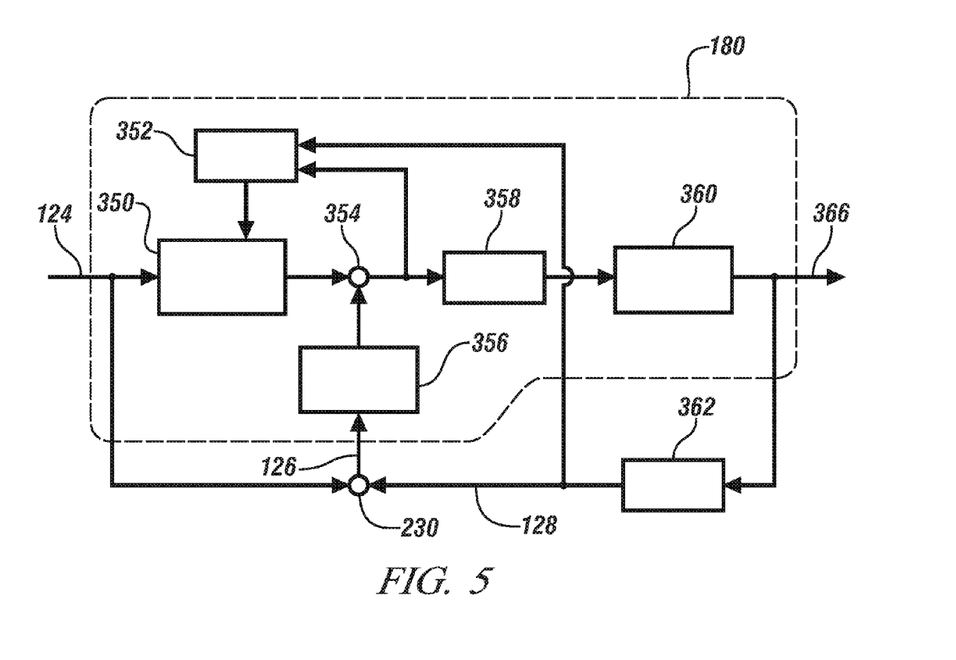
FIG. 5 illustrates control of clutch pressure based upon a clutch pressure command, in accordance with the present disclosure.

FIG. 5 graphically illustrates control of clutch pressure based upon a clutch pressure command. One embodiment of closed-loop pressure regulation module 180 uses EDC pressure command 124, actual EDC pressure 128, and pressure difference value 126 to control clutch pressure 366. The illustrated pressure sensor 362 can be replaced by a pressure estimate. The illustrated method is one exemplary method to accomplish pressure control, however a number of methods are known in the art. In one embodiment, a variable force solenoid (VFS) uses current controlled valves to accomplish pressure control. In another embodiment, a duty cycle PWM command can vary voltage rather than current to accomplish pressure control. Open-loop pressure controller module 350 monitors EDC pressure command 124 and determines an open-loop pressure control solenoid current. Summation module 230 compares EDC pressure command to actual EDC pressure 128 to form pressure difference value 126. Open-loop pressure controller module 350 can, for example, utilize a PI curve to determine the open-loop pressure control solenoid current. Closed-loop pressure controller module 356 monitors pressure difference value 126 and determines a closed-loop pressure control solenoid current. The open-loop pressure control solenoid current and the closed-loop pressure control solenoid current are summed by summation module 354 to form a pressure control solenoid current command Current controller 358 monitors the pressure control solenoid current command and outputs a pressure control solenoid current. PI curve adaption module 352 monitors the pressure control solenoid current command and the actual EDC pressure 128 and determines a PI curve adaptation for use by open-loop pressure controller module 350. Pressure control solenoid 360 is operated by the pressure control solenoid current and creates clutch pressure 366. Clutch pressure 366 is monitored by pressure sensor 362 which outputs the feedback terms utilized by modules 356 and 352. FIG. 5 illustrates one exemplary method to accomplish pressure control, however a number of methods are known in the art and the disclosure is not intended to be limited to the exemplary embodiments provided herein.

Figure 6:
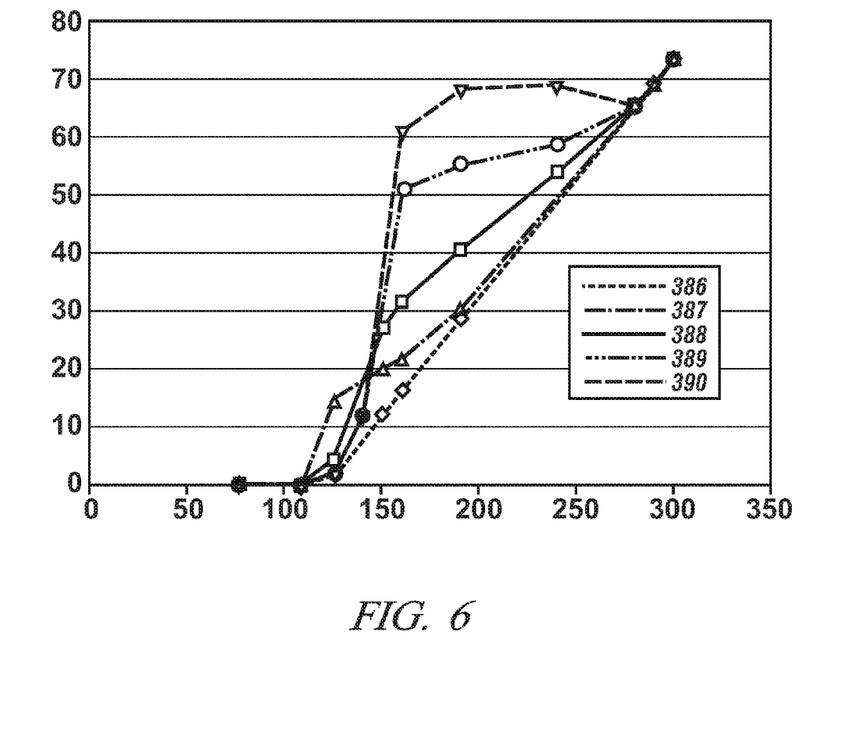
FIG. 6 illustrates an exemplary EDC pressure-to-torque feed-forward compensation, in accordance with the present disclosure.

Methods disclosed herein benefit from accurate control of clutch torques through control of clutch pressures. As disclosed in relation to FIG. 5, a closed-loop and an open-loop control can be used to improve accuracy of clutch control. FIG. 6 illustrates an exemplary EDC pressure-to-torque feed-forward compensation to account for the apparent difference between the predicted clutch torque and the actual clutch torque at lower clutch pressures due to nonlinearity in the clutch pressure-to-torque relationship. A horizontal axis illustrates a clutch pressure delivered to the EDC in kPa. A vertical axis illustrates resulting torque capacity of the EDC in Newton meters. The baseline plot 386 is the original clutch pressure to clutch torque conversion based upon linear behavior in the clutch. The compensated plots 387, 388, 389, and 390 show clutch pressure to clutch torque conversion with feed forward compensation terms included. According to one embodiment, plot 390 was selected as an optimal EDC pressure-to-torque feed forward compensation selection. According to one embodiment, feed forward compensation terms can be utilized in pressure-torque compensation model 205 to account for non-linear behavior in the clutch.

Methods disclosed include filling an EDC according to an engine speed profile. However, engaging a previously disengaged clutch requires not only compressing the elements of the clutch but also requires filling the piston associated with the clutch. A method is known to begin a process to engage a clutch by utilizing a calibrated fill pulse at a high pressure to begin the clutch engagement and reduce any time lag associated with filling the piston. Utilizing a fill pulse enables a method that relies on minimal torque control of the clutch. To limit the band-width requirement of the hydraulic actuation, a step command can be given for the initial clutch torque command after the clutch fill. Using this method, the clutch can transmit a relatively constant torque, which reduces a discrepancy between the commanded clutch torque and the estimated clutch torque, allowing for better compensation of EDC torque by the motor. While the EDC is slipping, any variations in engine torque are not transmitted through the clutch to the driveline, and only impact the acceleration of the engine. According to one embodiment, the lower bandwidth hydraulically actuated clutch can be used as the coarse actuator, for example utilizing a torque capacity to control a constant torque transmission value, and the much higher bandwidth motor can then be used as the fine actuator in a coarse-fine control configuration.

Figure 7:
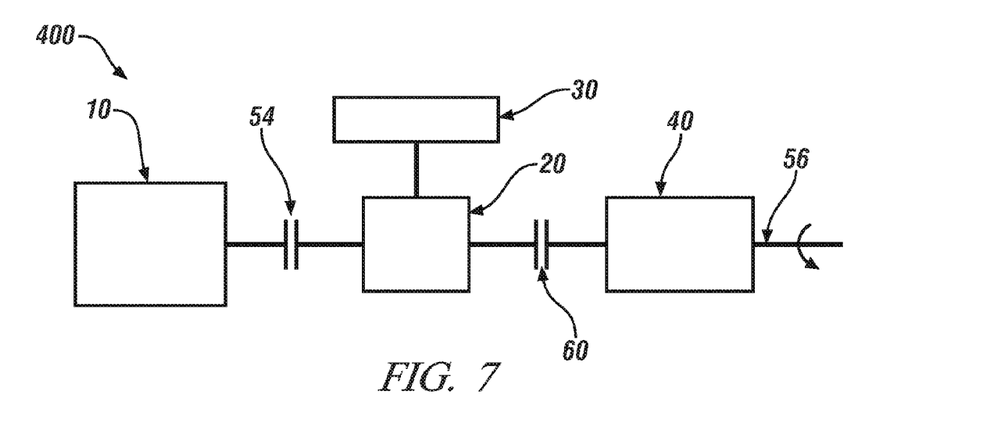
FIG. 7 illustrates an exemplary powertrain including a transmission output clutch, in accordance with the present disclosure.

The motor can be controlled to provide torque based upon providing an output torque to the driveline and torque to support a flying engine start as disclosed. However, the control system can include imperfect determinations and control lag times, resulting in some variations to the motor torque transmitted to the driveline. These variations to the motor torque can be further reduced using modulated pressure to a transmission output clutch. FIG. 7 illustrates an exemplary powertrain including a transmission output clutch. Configuration 400 includes engine 10, motor 20, energy storage device 30, transmission device 40, and clutch device 54. Further, transmission input clutch 60 is illustrated. When transmission input clutch 60 is fully engaged, torque transmitted by or through motor 20 can be transmitted through transmission input clutch 60 up to a torque capacity for the clutch. However, if transmission input clutch 60 is operated at some reduced pressure resulting in a lower torque capacity for the clutch, then the clutch will begin to slip at some torque in excess of the lower torque capacity. As a result, torque transmitted by motor 20 through transmission input clutch 60 in excess of the lower torque capacity will not be transmitted to transmission 40 or driveline 56. Transmission input clutch 60 is illustrated as a device separate from transmission 40. In another embodiment, transmission input clutch 60 can be a part of transmission 40 or can be an equivalent clutch device within transmission 40.

Figure 8:
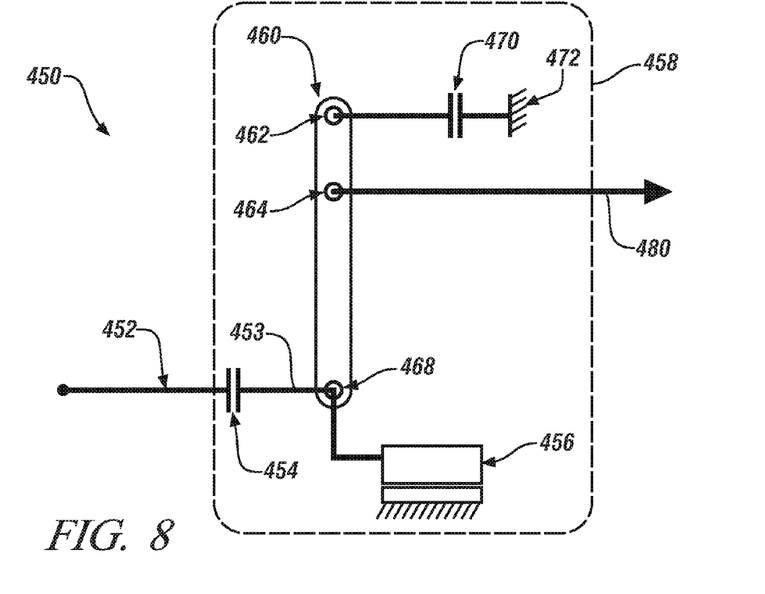
FIG. 8 illustrates an exemplary powertrain including a transmission output clutch utilized within a transmission, in accordance with the present disclosure.

FIG. 7 illustrates one exemplary embodiment of a powertrain including a transmission output clutch. However, other configurations of transmissions including a transmission output clutch are known. FIG. 8 illustrates an exemplary powertrain including a transmission output clutch utilized within a transmission. Configuration 450 includes shaft 452 connected to a crankshaft of an engine, EDC 454, transmission 458, and output shaft 480. Transmission 458 includes transmission input shaft 453, motor 456, planetary gear set 460, and clutch 470 connected to ground 472. Planetary gear set includes a sun gear 468 connected to transmission input shaft 453 and motor 456, planet gear 464 connected to the output shaft 480, and ring gear 462 connected to clutch 470. Motor 456 can directly supply torque to sun gear 456 and to input shaft 453. Torque applied to input shaft 453 can be transmitted to shaft 452 and the connected engine through EDC 454. Torque applied to sun gear 468 acts upon planet gear 464. Depending upon the state of clutch 470, torque acting upon planet gear 464 can transmitted to output shaft 480 as output torque or can be dissipated through the spinning of ring gear 462. If clutch 470 is fully engaged, then torque based upon the torque capacity of the clutch will be transmitted to the output shaft. If, however, the pressure to clutch 470 is reduced, the corresponding lower torque capacity of clutch 470 can be utilized to limit torque transmission to output shaft 480 in the same way transmission input clutch 60 is utilized in configuration 400. By modulating the pressure to clutch 470, spikes in torque above the torque capacity of the clutch are filtered out by the clutch slipping. In this way, modulating pressure to a transmission output clutch can improve drivability.

Figure 9:
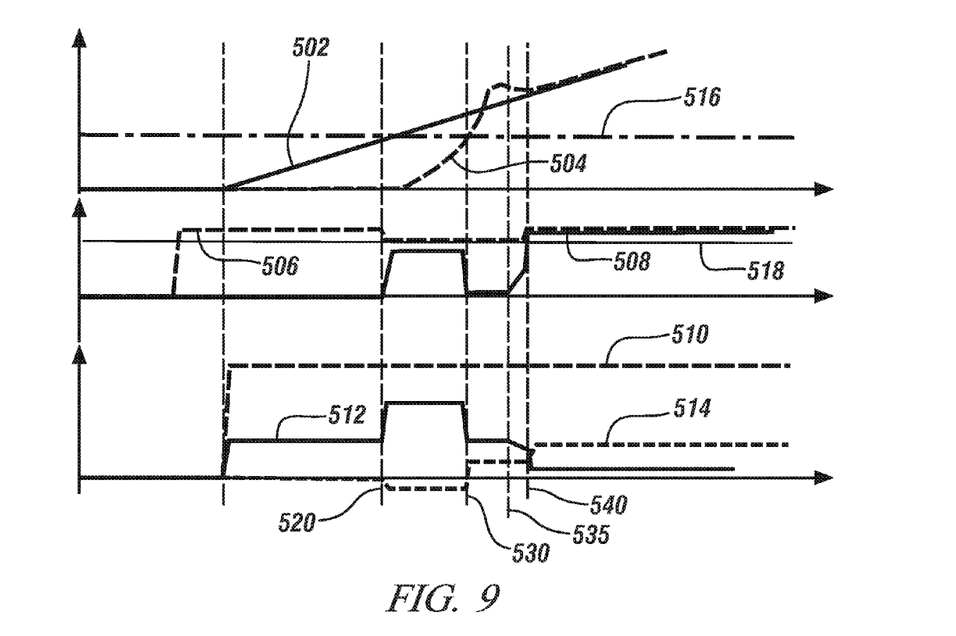
FIG. 9 illustrates an exemplary flying engine start including modulating pressure to a transmission output clutch, in accordance with the present disclosure.

FIG. 9 graphically illustrates an exemplary flying engine start including modulating pressure to a transmission output clutch. In a top portion of the figure, a horizontal axis illustrates a time period in seconds and a vertical axis illustrates shaft speed in revolutions per minute. An input speed 502 and an engine speed 504 are illustrated. In a central portion of the figure, a horizontal axis corresponds to the same time period as illustrated in the top portion and a vertical axis illustrates clutch engagement. Transmission output clutch 506 and EDC 508 are illustrated. In a bottom portion of the figure, a horizontal axis corresponds to the same time period as illustrated in the top portion, and a vertical axis illustrates torque. Output torque 510, motor torque 512, and engine torque 514 are illustrated. Input speed 502 accelerates from zero at a constant rate. Transmission output clutch 506 is initially set to a fully engaged state and initially maintained at that state. Output torque 510 is set to a value and maintained. In a period starting when the input speed 502 begins to accelerate, motor torque 512 is set to a value to generate output torque 510. Additionally, transmission output clutch 506 torque capacity is reduced to some value at or above the reaction torque required for the current output torque until the EDC clutch is eventually fully engaged. An exemplary required reaction torque value 518 is illustrated. By reducing pressure to transmission output clutch 506, torque transmission to the output shaft can be limited, protecting the output from torque variation during the flying engine start. For a period after input 502 begins to accelerate, the engine speed 504 remains at zero and the EDC 508 remains in a disengaged state. At time 520, stage A of a flying engine start is initiated. EDC 508 changes to a slip state, wherein motor torque 512 can be utilized to provide torque to the engine while the engine speed 504 and the input speed 502 remain different values. At time 520, engine speed 504 begins to accelerate, and motor torque 512 increases in order to provide torque to the engine while maintaining output torque 510. At time 530, engine speed 504 achieves an engine firing speed 516, and stage B of the flying engine start can be initiated. At time 530, the engine can be fired and made operational, providing an engine torque and accelerating the engine speed 504 based upon an engine speed profile selected to achieve $N_{e\_synch}$. EDC 508 can be reduced to a minimum level and motor torque 512 returns to a level maintaining the output torque 510 without providing any torque to the engine. At time 535, stage C of the flying engine start is initiated. EDC 508 is increased, and motor torque in a negative direction is used to adjust engine speed 504 based upon $N_{e\_synch}$. At time 540, stage D of the flying engine start is initiated, $N_{e\_synch}$ is achieved, and the EDC 508 can be fully engaged.

Figure 10:
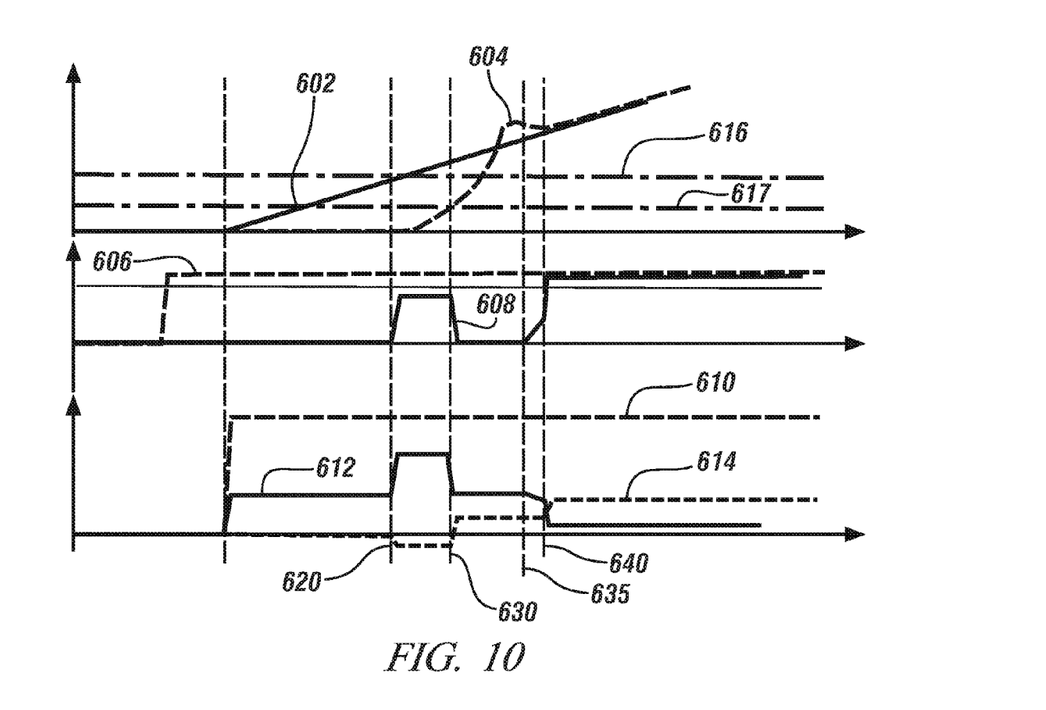
FIG. 10 illustrates an exemplary flying engine start including a combustion assist method, in accordance with the present disclosure.

FIG. 10 graphically illustrates an exemplary flying engine start including a combustion assist method, utilizing a lower engine firing speed, in accordance with the present disclosure. In a top portion of the figure, a horizontal axis illustrates a time period in seconds and a vertical axis illustrates shaft speed in revolutions per minute. An input speed 602 and an engine speed 604 are illustrated. In a central portion of the figure, a horizontal axis corresponds to the same time period as illustrated in the top portion and a vertical axis illustrates clutch engagement. Transmission output clutch 606 and EDC 608 are illustrated. In a bottom portion of the figure, a horizontal axis corresponds to the same time period as illustrated in the top portion, and a vertical axis illustrates torque. Output torque 610, motor torque 612, and engine torque 614 are illustrated. Input speed 602 accelerates from zero at a constant rate. Transmission output clutch 606 is initially set to a fully engaged state and maintained at that state. Output torque 610 is set to a value and maintained. In a period starting when the input speed 602 begins to accelerate, motor torque 612 is set to a value to generate output torque 610. For a period after input 602 begins to accelerate, the engine speed 604 remains at zero and the EDC 608 remains in a disengaged state. At time 620, stage A of a flying engine start is initiated. EDC 608 changes to a slip state, wherein motor torque 612 can be utilized to provide torque to the engine while the engine speed 604 and the input speed 602 remain different values. At time 620, engine speed 604 begins to accelerate, and motor torque 612 increases in order to provide torque to the engine while maintaining output torque 610. A normal engine firing speed 616 is illustrated, whereat an engine can be normally started as illustrated in the method of FIG. 9. However, as is known in the art, an engine can be fired through a range of speeds. A minimum engine firing speed 617 can be determined for an engine, being provided torque by a motor, whereat the engine can be started. By utilizing minimum engine firing speed 617, torque can be provided by the engine at an earlier point in the flying engine start, thereby permitting a more aggressive acceleration of the engine. In FIG. 10, at time 630, engine speed 604 achieves minimum engine firing speed 617, and stage B of the flying engine start can be initiated. At time 630, the engine can be fired and made operational, providing an engine torque and accelerating the engine speed 604 based upon an engine speed profile selected to achieve $N_{e\_synch}$. EDC 608 can be reduced to a minimum level and motor torque 612 returns to a level maintaining the output torque 610 without providing any torque to the engine. At time 635, stage C of the flying engine start is initiated. EDC 608 is increased, and motor torque in a negative direction is used to adjust engine speed 604 based upon $N_{e\_synch}$. At time 640, stage D of the flying engine start is initiated, $N_{e\_synch}$ is achieved, and the EDC 608 can be fully engaged. By firing the engine at the lower firing speed, a speed below the normal engine firing speed, torque from the engine can be used earlier in the method and reducing the amount of motor torque that must be utilized. Methods known in the art can be utilized to determine both a normal engine firing speed and a lower engine firing speed for a particular engine and powertrain configuration.

Figure 11:
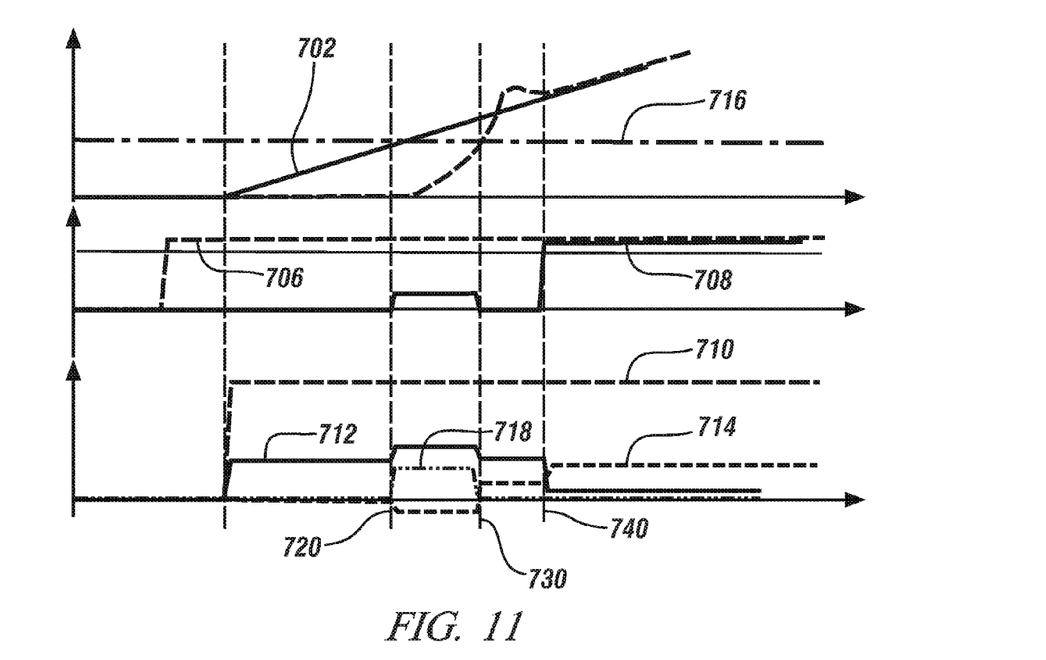
FIG. 11 illustrates an exemplary flying engine start including utilizing torque from the engine to achieve a synchronization speed, in accordance with the present disclosure.

FIG. 11 graphically illustrates an exemplary flying engine start including utilizing torque from the engine to achieve a synchronization speed and using motor 62 to assist motor 20 with the flying engine start. In a top portion of the figure, a horizontal axis illustrates a time period in seconds and a vertical axis illustrates shaft speed in revolutions per minute. An input speed 702 and an engine speed 704 are illustrated. In a central portion of the figure, a horizontal axis corresponds to the same time period as illustrated in the top portion and a vertical axis illustrates clutch engagement. Transmission output clutch 706 and EDC 708 are illustrated. In a bottom portion of the figure, a horizontal axis corresponds to the same time period as illustrated in the top portion, and a vertical axis illustrates torque. Output torque 710, torque 712 for motor 20, torque 718 for motor 62, and engine torque 714 are illustrated. Input speed 702 accelerates from zero at a constant rate. Transmission output clutch 706 is initially set to a fully engaged state and maintained at that state. Output torque 710 is set to a value and maintained. In a period starting when the input speed 702 begins to accelerate, motor torque 712 is set to a value to generate output torque 710. For a period after input 702 begins to accelerate, the engine speed 704 remains at zero and the EDC 708 remains in a disengaged state. At time 720, stage A of a flying engine start is initiated. EDC 708 changes to a slip state, wherein motor torque 712 can be utilized to provide torque to the engine while the engine speed 704 and the input speed 702 remain different values. At time 720, engine speed 704 begins to accelerate, and motor torques 712 and 718 increase in order to provide torque to the engine while maintaining output torque 710. Torque 718 is controlled to provide additional torque from motor 62, aiding acceleration of the engine. Torque 718 can be controlled based upon calibrated behavior of the powertrain or other inputs. At time 730, engine speed 704 achieves an engine firing speed 716, and stage B of the flying engine start can be initiated. At time 730, the engine can be fired and made operational, providing an engine torque and accelerating the engine speed 704 based upon an engine speed profile selected to achieve $N_{e\_synch}$. EDC 708 can be reduced to a minimum level, motor torque 718 can be reduced to zero, and motor torque 712 returns to a level maintaining the output torque 710 without providing any torque to the engine. In FIG. 9, at time 535, stage C of the flying engine start is initiated. In FIG. 11, a method is illustrated wherein stage C is omitted from the flying engine start, and instead engine torque 714 is utilized to achieve $N_{e\_synch}$ through an extended stage B. Once $N_{e\_synch}$ is achieved at time 740, stage D of the flying engine start is initiated, and the EDC 708 can be fully engaged.

Figure 12:
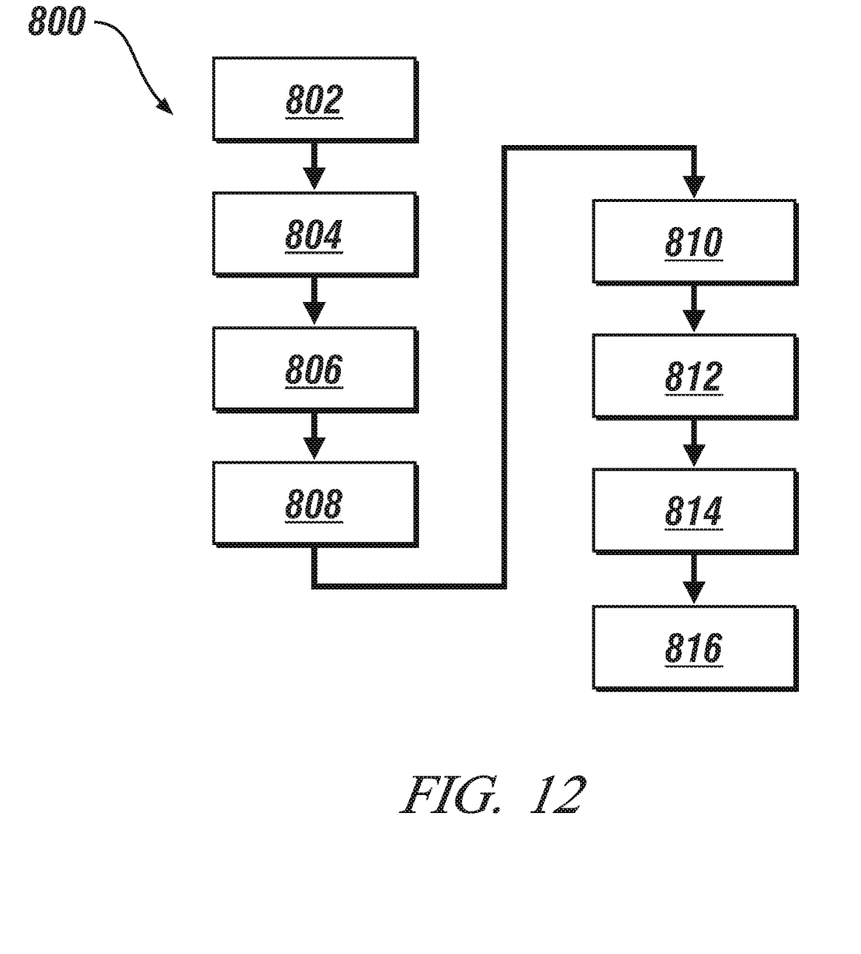
FIG. 12 illustrates an exemplary process for executing a flying engine start, in accordance with the present disclosure.

FIG. 12 illustrates an exemplary process for executing a flying engine start. Table 1 is provided as a key wherein the numerically labeled blocks and the corresponding functions are set forth as follows.

TABLE 1

| BLOCK | BLOCK CONTENTS |
|---|---|
| 802 | Start |
| 804 | Monitor Command to Operate a Flying Engine Start |
| 806 | Monitor or Determine $N_{e\_synch}$ |
| 808 | Operate Stage A |
| 810 | Operate Stage B |
| 812 | Operate Stage C |
| 814 | Operate Stage D |
| 816 | End |

Process 800 begins at block 802. At block 804, a command to operate a flying engine start is monitored. At block 806, $N_{e\_synch}$ is monitored or determined, for example, based upon an input speed profile. In blocks 808 through 814, a flying engine start is executed in stages A through D, respectively. At block 816, the process ends. Variations on process 800 are possible, for example, with block 806 being executed iteratively through a flying engine start, such that $N_{e\_synch}$ is updated based upon actual acceleration of the engine and the actual acceleration or speed of the input shaft and motor. A number of exemplary processes to execute a flying engine start are envisioned, and the disclosure is not intended to be limited to the particular exemplary embodiments provided herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A control-module implemented method to control a flying engine start in a powertrain comprising an electric motor providing a propulsion torque to a transmission input shaft, an internal combustion engine, and an engine disconnect clutch selectively providing torque transfer between the engine and the motor, the method comprising:

monitoring an output torque request;
determining the propulsion torque to the transmission input shaft based upon the output torque request;
monitoring a desired input speed;
determining a synchronization speed based upon the desired input speed;
determining, by a controller, a desired engine activation speed profile based upon the synchronization speed, comprising:
determining a first stage wherein a compensation torque is provided from the motor to the engine through the engine disconnect clutch to accelerate the engine from a stopped state to an engine firing speed;
once the engine firing speed is achieved, determining a second stage wherein the engine provides torque to accelerate the engine while simultaneously reducing the compensation torque provided from the motor to the engine;
determining a third stage subsequent to the second stage wherein the compensation torque is provided to the engine by the motor to control the engine to the synchronization speed; and
determining a fourth stage wherein the engine disconnect clutch is locked; and
controlling the motor to provide a motor torque based upon a sum of the propulsion torque and the compensation torque.

2. The method of claim 1, wherein monitoring the desired input speed comprises monitoring a desired input speed profile; and
wherein determining the synchronization speed comprises determining the synchronization speed based upon the desired input speed profile and a capability of the engine to accelerate.

3. The method of claim 1, wherein the engine firing speed comprises a minimum engine firing speed.

4. The method of claim 3, wherein the compensation torque is determined using an open-loop clutch control term and a closed-loop clutch control term; and
wherein determining the engine activation speed profile further comprises determining the second stage wherein an engine torque command is limited to be less than the open-loop clutch control term.

5. The method of claim 1, wherein the compensation torque is determined using an open-loop clutch control term and a closed-loop clutch control term; and
wherein determining the engine activation speed profile further comprises determining the second stage wherein an engine torque command is limited to be less than the open-loop clutch control term.

6. The method of claim 1, wherein determining the engine activation speed profile further comprises determining the second stage wherein a torque capacity of the engine disconnect clutch is reduced to a nonzero minimum value.

7. The method of claim 1, wherein the engine firing speed comprises a minimum engine firing speed.

8. The method of claim 1, wherein controlling the motor is based upon a sum of the propulsion torque, the compensation torque, and a driveline active damping control torque.

9. The method of claim 1, wherein determining the compensation torque comprises:
determining a torque required to turn the engine; and
determining the compensation torque based upon the torque required to turn the engine.

10. The method of claim 1, wherein determining the compensation torque comprises determining an open-loop clutch control term and a closed-loop clutch control term.

11. The method of claim 10, wherein determining the open-loop clutch control term comprises utilizing an engine disconnect clutch pressure-to-torque feed-forward compensation value.

12. The method of claim 1, wherein determining the compensation torque comprises:
determining the compensation torque based upon an engine starting position.

13. The method of claim 1, further comprising reducing a torque capacity of a transmission clutch to dampen an effect of the flying engine start upon an output torque of the transmission, wherein the transmission clutch includes a first element coupled to the motor and a second element coupled to the transmission input shaft for selectively providing torque transfer between the motor and the transmission when the transmission clutch is engaged.

14. The method of claim 1, further comprising reducing a torque capacity of the engine disconnect clutch to dampen an effect of the flying engine start upon an output torque of the transmission.

15. The method of claim 1, further comprising controlling a second motor to provide a second motor torque based upon the sum of the propulsion torque and the compensation torque.

16. System to control a flying engine start in a powertrain comprising an electric motor providing a propulsion torque to a transmission input shaft of a transmission, an internal combustion engine, and an engine disconnect clutch selectively providing torque transfer between the engine and the motor, the system comprising:
the motor; and
a control module configured for:
monitoring an output torque request;
determining the propulsion torque to the transmission input shaft based upon the output torque request;
monitoring a desired input speed;
determining a synchronization speed based upon the desired input speed;
determining a desired engine activation speed profile based upon the synchronization speed, comprising:
determining a first stage wherein a compensation torque is provided to the engine through the engine disconnect clutch to accelerate the engine from a stopped state to an engine firing speed, once the engine firing speed is achieved,
determining a second stage wherein the engine provides torque to accelerate the engine while simultaneously reducing the compensation torque provided to the engine,
determining a third stage subsequent to the second stage wherein the compensation torque is provided to the engine by the motor to control the engine to the synchronization speed, and
determining a fourth stage wherein the engine disconnect clutch is locked; and
controlling the motor to provide a motor torque based upon a sum of the propulsion torque and the compensation torque.

\* \* \* \* \*